US011355141B2

(12) United States Patent
Tang et al.

(10) Patent No.: US 11,355,141 B2
(45) Date of Patent: *Jun. 7, 2022

(54) WRITER WITH NARROWER HIGH MOMENT TRAILING SHIELD

(71) Applicant: Headway Technologies, Inc., Milpitas, CA (US)

(72) Inventors: Yuhui Tang, Milpitas, CA (US); Ying Liu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/115,065

(22) Filed: Dec. 8, 2020

(65) Prior Publication Data

US 2021/0090594 A1 Mar. 25, 2021

Related U.S. Application Data

(63) Continuation-in-part of application No. 16/507,179, filed on Jul. 10, 2019, now Pat. No. 10,861,486.

(51) Int. Cl.
*G11B 5/31* (2006.01)
*G11B 5/127* (2006.01)
(Continued)

(52) U.S. Cl.
CPC .............. *G11B 5/1278* (2013.01); *G11B 5/02* (2013.01); *G11B 5/105* (2013.01); *G11B 5/23* (2013.01);
(Continued)

(58) Field of Classification Search
None
See application file for complete search history.

(56) References Cited

U.S. PATENT DOCUMENTS 6,785,092 B2   8/2004   Covington et al.
6,809,899 B1   10/2004  Chen et al.
(Continued)

FOREIGN PATENT DOCUMENTS

JP   2002-133610   5/2002
JP   2002-298309   10/2002
(Continued)

OTHER PUBLICATIONS

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

(Continued)

*Primary Examiner* — Jefferson A Evans
(74) *Attorney, Agent, or Firm* — Saile Ackerman LLC; Stephen B. Ackerman

(57) ABSTRACT

A PMR (perpendicular magnetic recording) write head configured for microwave assisted magnetic recording (MAMR) in the form of spin assisted writing (SAW) or spin torque oscillation (STO) includes a spin-torque oscillator (STO) or SAW device and trailing shield formed of high moment magnetic material (HMTS). By patterning the STO or SAW and the HMTS in a simultaneous process the HMTS and the STO or SAW layers are precisely aligned and have very similar cross-track widths. In addition, the write gap at an off-center location has a thickness that is independent from its center-track thickness and the write gap total width can have a flexible range whose minimum value is the same width as the STO or SAW width.

11 Claims, 6 Drawing Sheets

(51) Int. Cl.
  *G11B 5/02*   (2006.01)
  *G11B 5/23*   (2006.01)
  *G11B 5/48*   (2006.01)
  *G11B 5/105*  (2006.01)
  *G11B 5/265*  (2006.01)
  *G11B 5/00*   (2006.01)
  *G11B 5/11*   (2006.01)

(52) U.S. Cl.
  CPC ............ *G11B 5/2655* (2013.01); *G11B 5/312* (2013.01); *G11B 5/315* (2013.01); *G11B 5/3133* (2013.01); *G11B 5/3146* (2013.01); *G11B 5/4826* (2013.01); *G11B 5/11* (2013.01); *G11B 5/3153* (2013.01); *G11B 2005/0024* (2013.01)

(56) References Cited

U.S. PATENT DOCUMENTS

| | | | |
|---|---|---|---|
| 6,954,340 B2 | 10/2005 | Shukh et al. | |
| 7,009,812 B2 | 3/2006 | Hsu et al. | |
| 7,589,600 B2 | 9/2009 | Dimitrov et al. | |
| 7,724,469 B2 | 5/2010 | Gao et al. | |
| 7,835,111 B2 | 11/2010 | Flint et al. | |
| 7,957,098 B2 | 6/2011 | Yamada et al. | |
| 7,963,024 B2 | 6/2011 | Neuhaus | |
| 7,978,442 B2 | 7/2011 | Zhang et al. | |
| 7,982,996 B2 | 7/2011 | Smith et al. | |
| 8,027,110 B1 | 9/2011 | Yamanaka et al. | |
| 8,064,244 B2 | 11/2011 | Zhang et al. | |
| 8,068,312 B2 | 11/2011 | Jiang et al. | |
| 8,154,825 B2 | 4/2012 | Takashita et al. | |
| 8,203,389 B1 | 6/2012 | Zhou et al. | |
| 8,264,792 B2 | 9/2012 | Bai et al. | |
| 8,270,112 B2 | 9/2012 | Funayama et al. | |
| 8,295,008 B1 | 10/2012 | Sasaki et al. | |
| 8,310,787 B1 | 11/2012 | Sasaki et al. | |
| 8,320,079 B2 | 11/2012 | Iwasaki et al. | |
| 8,427,781 B1 | 4/2013 | Sasaki et al. | |
| 8,446,690 B2 | 5/2013 | Alex et al. | |
| 8,462,461 B2 | 6/2013 | Braganca et al. | |
| 8,472,135 B1* | 6/2013 | Kusukawa | G11B 5/1278 360/110 |
| 8,477,452 B2 | 7/2013 | Sasaki et al. | |
| 8,493,687 B2 | 7/2013 | Sasaki et al. | |
| 8,498,079 B1 | 7/2013 | Song et al. | |
| 8,547,661 B2 | 10/2013 | Bai | |
| 8,582,240 B1 | 11/2013 | Chen et al. | |
| 8,582,241 B1 | 11/2013 | Yu et al. | |
| 8,604,886 B2 | 12/2013 | Nikonov et al. | |
| 8,634,163 B2 | 1/2014 | Tanabe et al. | |
| 8,749,919 B2 | 6/2014 | Sasaki et al. | |
| 8,767,347 B1 | 7/2014 | Sasaki et al. | |
| 8,792,210 B2 | 7/2014 | de la Fuente et al. | |
| 8,995,088 B1 | 3/2015 | Boone | |
| 9,047,894 B2 | 6/2015 | Chiu | |
| 9,142,228 B2 | 9/2015 | Fujita et al. | |
| 9,230,571 B1 | 1/2016 | Chen et al. | |
| 9,299,367 B1 | 3/2016 | Tang et al. | |
| 9,355,654 B1 | 5/2016 | Mallary | |
| 9,355,655 B1 | 5/2016 | Udo | |
| 9,361,912 B1 | 6/2016 | Liu et al. | |
| 9,406,317 B1 | 8/2016 | Tang et al. | |
| 9,466,319 B1 | 10/2016 | Tnag et al. | |
| 9,508,364 B1 | 11/2016 | Tang | |
| 9,536,548 B1 | 1/2017 | Narayana | |
| 9,558,765 B2 | 1/2017 | Zhang et al. | |
| 9,626,990 B2 | 4/2017 | Tang et al. | |
| 9,747,932 B1* | 8/2017 | Taguchi | G11B 5/235 |
| 9,824,701 B2 | 11/2017 | Tang et al. | |
| 9,934,797 B2 | 4/2018 | Takahashi et al. | |
| 9,966,091 B2 | 5/2018 | Chen et al. | |
| 10,032,469 B2 | 7/2018 | Lim et al. | |
| 10,032,470 B1 | 7/2018 | Degawa | |
| 10,037,772 B2 | 7/2018 | Okamura et al. | |
| 10,109,302 B1 | 10/2018 | Shinohara | |
| 10,121,497 B1 | 11/2018 | Takahashi et al. | |
| 10,210,888 B1 | 2/2019 | Li | |
| 10,366,714 B1 | 7/2019 | Olson | |
| 10,424,326 B1 | 9/2019 | Chen et al. | |
| 10,446,178 B1 | 10/2019 | Tang | |
| 10,490,216 B1 | 11/2019 | Chen et al. | |
| 10,522,174 B1 | 12/2019 | Chen et al. | |
| 10,522,178 B1 | 12/2019 | Liu | |
| 10,714,129 B1 | 7/2020 | Tang | |
| 10,714,136 B1* | 7/2020 | Chen | G11B 5/3133 |
| 10,770,103 B1* | 9/2020 | Liu | G11B 5/6082 |
| 10,770,104 B1* | 9/2020 | Chen | G11B 5/37 |
| 10,861,486 B1 | 12/2020 | Tang | |
| 10,867,626 B1* | 12/2020 | Li | G11B 5/1278 |
| 11,170,802 B2* | 11/2021 | Tang | G11B 5/3153 |
| 11,257,514 B2* | 2/2022 | Freitag | G11B 5/313 |
| 2002/0034043 A1 | 3/2002 | Okada et al. | |
| 2004/0150910 A1 | 8/2004 | Okada et al. | |
| 2005/0128637 A1 | 6/2005 | Johnston et al. | |
| 2005/0141137 A1 | 6/2005 | Okada et al. | |
| 2006/0044682 A1 | 3/2006 | Le et al. | |
| 2006/0087765 A1 | 4/2006 | Iwakura et al. | |
| 2006/0103978 A1 | 5/2006 | Takano et al. | |
| 2007/0177301 A1 | 8/2007 | Han et al. | |
| 2008/0013209 A1 | 1/2008 | Sasaki et al. | |
| 2008/0088972 A1 | 4/2008 | Sasaki et al. | |
| 2009/0059426 A1 | 3/2009 | Sasaki et al. | |
| 2009/0080106 A1 | 3/2009 | Shimizu et al. | |
| 2009/0128953 A1 | 5/2009 | Jiang et al. | |
| 2009/0296275 A1 | 12/2009 | Sasaki et al. | |
| 2010/0165517 A1 | 7/2010 | Araki et al. | |
| 2010/0214692 A1* | 8/2010 | Kief | G11B 5/3156 |
| 2011/0090603 A1* | 4/2011 | Bai | G11B 5/3153 216/22 |
| 2011/0211271 A1 | 9/2011 | Ng et al. | |
| 2011/0279921 A1 | 11/2011 | Zhang | |
| 2012/0126905 A1 | 5/2012 | Zhang | |
| 2012/0292723 A1 | 11/2012 | Luo et al. | |
| 2012/0295132 A1 | 11/2012 | Min | |
| 2013/0082787 A1 | 4/2013 | Zhang | |
| 2013/0329316 A1 | 12/2013 | Watanabe | |
| 2014/0071562 A1 | 3/2014 | Chen et al. | |
| 2014/0133048 A1 | 5/2014 | Shimoto | |
| 2014/0177092 A1 | 6/2014 | Katada et al. | |
| 2015/0043106 A1 | 2/2015 | Yamada et al. | |
| 2015/0124347 A1 | 5/2015 | Shimoto | |
| 2016/0086623 A1 | 3/2016 | Nagasaka | |
| 2016/0148627 A1 | 5/2016 | Nagasaka | |
| 2016/0218728 A1 | 7/2016 | Zhu | |
| 2017/0061995 A1 | 3/2017 | Taguchi | |
| 2017/0133044 A1 | 5/2017 | Lim | |
| 2017/0309301 A1 | 10/2017 | Takahashi | |
| 2018/0025746 A1 | 1/2018 | Okamura et al. | |
| 2018/0075868 A1 | 3/2018 | Koui et al. | |
| 2019/0251992 A1 | 8/2019 | Ho | |
| 2019/0259413 A1 | 8/2019 | Le | |
| 2019/0279665 A1 | 9/2019 | Li | |
| 2020/0176022 A1* | 6/2020 | Li | G11B 5/11 |
| 2020/0312354 A1* | 10/2020 | Wu | G11B 5/3143 |
| 2020/0381012 A1* | 12/2020 | Chembrolu | G11B 5/1875 |
| 2021/0012793 A1 | 1/2021 | Tang et al. | |
| 2021/0056987 A1* | 2/2021 | Wu | G11B 5/3146 |

FOREIGN PATENT DOCUMENTS

| | | |
|---|---|---|
| JP | 2008-021398 | 1/2008 |
| JP | 2010-157303 | 7/2010 |

OTHER PUBLICATIONS

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.
U.S. Notice of Allowance, U.S. Appl. No. 16/209,151, First named Inventor: Wenyu Chen, dated Aug. 15, 2019, 17 pages.

(56) References Cited

OTHER PUBLICATIONS

U.S. Notice of Allowance, U.S. Appl. No. 16/549,139, First named Inventor: Wenyu Chen, dated Sep. 19, 2019, 8 pages.
U.S. Notice of Allowance, U.S. Appl. No. 16/197,586, First named Inventor: Wenyu Chen, dated May 15, 2019, 16 pages.
U.S. Notice of Allowance, U.S. Appl. No. 16/507,179, First named Inventor: Yuhui Tang, dated Aug. 24, 2020, 7 pages.
U.S. Office Action, U.S. Appl. No. 16/507,177, Applicant: Tang et al., dated Mar. 5, 2020, 10 pages.
U.S. Office Action, U.S. Appl. No. 16/507,177, Applicant: Tang et al., dated Dec. 22, 2020, 14 pages.
U.S. Notice of Allowance, U.S. Appl. No. 16/507,177, First named Inventor: Yuhui Tang, Oct. 16, 2020, 13 pages.
U.S. Notice of Allowance, U.S. Appl. No. 16/507,177, First named Inventor: Yuhui Tang, dated Aug. 6, 2020, 15 pages.
U.S. Office Action, U.S. Appl. No. 16/507,179, Applicant: Tang et al., dated Feb. 19, 2020, 13 pages.
PTO Office Action, U.S. Appl. No. 12/964,202, Applicant: Sasaki et al., Notification date: Nov. 28, 2012, 11 pages.
"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.
Microwave Assisted Magnetic Recording, by Jian-Gang Zhu et al., IEEE Transactions on Magnetics, vol. 44, No. 1, Jan. 1, 2008, pp. 125-131.
Nov. 13, 2012, Office Action issued in Japanese Patent Application No. 2011-149242.
Nov. 13, 2012, Office Action issued in Japanese Patent Application No. 2011-149243.
Nov. 13, 2012, Office Action issued in Japanese Patent Application No. 2011-149244.

* cited by examiner

WRITER WITH NARROWER HIGH MOMENT TRAILING SHIELD

This is a continuation-in-part of U.S. patent application Ser. No. 16/507,179 Filing Date Jul. 10, 2019, which is herein incorporated by reference in its entirety, and assigned to a common assignee.

RELATED PATENT APPLICATIONS

This application is related to Ser. No. 16/507,177, Filing Date Jul. 10, 2019, which is assigned to a common assignee and herein incorporated by reference in its entirety. This application is also related to U.S. Pat. Nos. 10,522,174, 10,490,216, and 10,424,326 all of which are assigned to a common assignee and fully incorporated by reference.

1. Technical Field

This disclosure relates generally to a thin-film magnetic writer used in microwave assisted magnetic recording (MAMR) to write on highly coercive recording disks and particularly to the design of magnetic shields for such a writer.

2. Background

To further increase the magnetic recording density of a hard disk drive (HDD) system, there have been growing demands for improvements in the performance of thin film magnetic heads. A perpendicular magnetic recording (PMR) head combining a single pole writer with a tunneling magnetoresistive (TMR) reader provides a high writing field and a large read-back signal, thus a higher areal density can be achieved. Increasing the magnetic recording areal density requires smaller grain size in the magnetic recording media, which in turn reduces storage lifetime due to thermal instabilities. In order to maintain durable storage lifetime, the thermal stability (energy barrier $\Delta=KV/k_bT$) has to be increased. In the formula, $k_bT$, $k_b$ is the Boltzmann constant, T is the temperature in Kelvin, V is the average grain size of the storage media, K, magnetic anisotropy, is equal to $H_kM_s/2$, where $H_k$ is the magnetic anisotropy field and $M_s$ is the saturation magnetization of the magnetic recording media. For smaller grain size media, K has to be increased to maintain the same thermal stability for storage, thus $H_k$ is greatly increased causing the magnetic media to have high coercivity $H_c$. As a consequence, the magnetic field generated by the magnetic writer main pole as well as the current from the coil around the main pole may not be strong enough to switch the magnetic media bits for data recording.

One way to address this magnetic recording dilemma is the use of heat-assisted magnetic recording (HAMR). The purpose of HAMR is to use heat energy to reduce the energy barrier ($\Delta=KV/k_bT$) of the grains of the magnetic recording media that must be overcome while writing the data (i.e., flipping the bit magnetic moment) with a magnetic recording field.

During data writing, a magnetic bit (or grain) in the media is heated by the application of laser-generated optical energy, in the form of surface-plasmon near-fields, causing the temperature of the magnetic bit to rise. When the temperature of the bit is significantly elevated, it can then be reversed in polarity by the previously insufficient applied magnetic field due to a reduction in the energy barrier $\Delta$. Once the bit polarity is changed, both the heating source and the applied writing field are quickly withdrawn. As the temperature reverts to room temperature, the switched state of the bit is stored in the magnetic recording media in a stable state. There are other mechanisms for adding energy to a magnetic bit so that it can have its polarity more easily reversed.

Spin transfer (spin torque) devices are based on a spin-transfer effect that arises from the spin dependent electron transport properties of ferromagnetic-spacer-ferromagnetic multilayers. When a spin-polarized current passes through a magnetic multilayer in a CPP (current perpendicular to plane) configuration, the spin angular moment of electrons incident on a ferromagnetic layer interacts with magnetic moments of the ferromagnetic layer near the interface between the ferromagnetic layer and the non-magnetic spacer. Through this interaction, the electrons transfer a portion of their angular momentum to the ferromagnetic layer. As a result, a spin-polarized current can switch the magnetization direction of the ferromagnetic layer if the current density is sufficiently high. Spin transfer devices are also known as spintronic devices and may have ferromagnetic (FM) layers with a perpendicular magnetic anisotropy (PMA) component where magnetization is aligned substantially perpendicular to the plane of the FM layer.

Microwave Assisted Magnetic Recording (MAMR) typically operates with the application of a bias current from the main pole across the STO device to a trailing shield, or vice versa, in order to apply spin torque on an oscillation layer (OL) so that the OL's oscillation generates a high frequency RF field. The RF field induces a resonant precessional state (at the RF frequency) on the magnetic bit in the recording media and effectively lowers the coercivity in its magnetic medium. Simultaneously, a write field from the main pole is applied from an air bearing surface (ABS) to the magnetic medium, and lower field strength is needed to write the bit (i.e., change its polarity) because of the RF field assist.

In spin-torque-assisted FGL reversal schemes, called spin-assisted writing (SAW) herein, a flux guide layer (FGL) magnetization flips to an opposite direction when the applied current is sufficiently large, thereby increasing the write gap reluctance, which causes a greater write field output and improves trailing shield response by making it more negative relative to the MP field. At the same time, the write field down-track gradient, ((H_MP–H_TS)/dx), is improved for two reasons, H of the main pole (MP) is increased while the return field H of the trailing shield (TS) is made more negative.

Both MAMR (with RF precessional motion) and the magnetic reversal (with flipping, but no precessional oscillatory motion) typically require a relatively high current density (>$10^8$ A/cm$^2$) to apply a useful spin torque assist for either generating a RF field or for FGL flipping. The oscillation cone angle in the FGL becomes smaller with increasing current density and substantially reduces the MAMR effect. Accordingly, no STO design exists that enables a substantial spin-torque-induced FGL reversal effect while simultaneously providing a significant MAMR effect. Thus, it would be desirable to have a STO device with a structure that allows both of the spin-torque-induced FGL reversal assist effect and MAMR effect for improved write performance over a structure where only one of spin torque assist and MAMR is applied and the other is essentially ineffective.

SUMMARY

Referring to FIG. 1C there is shown a schematic side cross-sectional view of a portion of a PMR recording head.

There is shown a magnetic pole cross-section, 10, the side cross-sectional view of the trailing shield 150, and arrows representing the field within the write gap 180 between the pole and the shield. At the distal end (ABS) of the figure there is shown a device comprising a spin polarization layer 170 situated on a flux control layer 160. Arrows 190 in the flux control layer represent a magnetic field that can be applied to reduce the net flux 180 in the gap thereby increasing the field produced by the pole 10.

The configuration shown in FIG. 1C is the basis of two types of MAMR devices, the spin torque oscillator (STO) device and the spin assisted writer (SAW) device, both already discussed above. Both devices typically operate by the application of a bias current from the main pole (MP) 10 to the trailing shield 150 and across either the spin torque oscillator (STO) or (SAW) device. In one case (STO), the system operates to generate a high frequency (microwave) oscillating RF field that creates a resonance precession in the magnetic bits of a magnetic recording media. In the other case it is to establish a field 190 that is directed counter to the gap field 180 while a strengthened MP field is applied from an air bearing surface (ABS) of the MP to the magnetic medium. In existing designs, spin torque is applied from only one side of the oscillation layer (OL) in the STO device. Preferably, FGL magnetization flips to an opposite direction when the applied current is sufficiently large enough. Accordingly, the write gap field flux from the MP to the trailing shield 180 is reduced (but is not oscillatory in a RF frequency) to enable the creation of a greater main pole field from the ABS to the magnetic medium.

Unlike the spin torque oscillator which causes the recording bits in the magnetic recording media to precess with a resonant microwave frequency and, thereby, to effectively lower the media coercivity, the spin assisted mechanism does not provide a resonant microwave precessional motion to the magnetic bit but rather reduces the magnetic field within the write gap which, in turn, enhances the magnetic flux emanating directly from the ABS face of the magnetic pole. Thus, the bits themselves are not given any additional precessional energy, rather the magnetic writing field is momentarily strengthened by reduction of the gap field so that it can cause the bits to flip.

The STO or SAW are usually aligned with the main pole (MP) cross-track width in order to maximize the performance. A high moment trailing shield (HMTS or, more simply, an HS) is used to attract the MP field back to the trailing side of the MP to improve the bits per inch (BPI) of the recording process. In conventional designs, the high moment trailing shield is much wider than MP in cross-track dimension. At least two problems are related to this prior-art wider width:

1. The wider HMTS has greater protrusion than surrounding shields, exposing the STO to additional reliability concerns.

2. A wider HMTS induces more magnetic charge in the write gap corner, and will cause a stronger stray field.

The prior arts have taken some steps to address these difficulties. However, they do not disclose the approach and method to be described in this disclosure nor do they treat the problem with the same degree of success as is done herein.

It will be an object of the present disclosure to provide a PMR (perpendicular magnetic recording) writer incorporated within a MAMR (microwave assisted magnetic recording) configuration or a spin assisted writing configuration in which a new design for a HMTS (high moment trailing shield) eliminates problems associated with the designs of the prior art.

It will be a further object of the present disclosure to provide the PMR configured for MAMR recording in two forms, a spin torque oscillator (STO) and spin assisted writing (SAW).

Specifically, in this new design, the high moment trailing shield has similar cross-track width as MP and STO and has smaller cross-track width than the write gap. The write gap is conformal along the cross-track direction, and outside the width of the high moment trailing shield, lower moment shielding material will be used. The down-track thickness of the high moment trailing shield can also be reduced for less protrusion. This new design will have two major benefits:

(1) less HMTS protrusion for better STO reliability, and (2) reduced adjacent track interference (ATI) due to less magnetic coupling at the write gap cross track edge.

These benefits are the result of several dimensional improvements that the disclosed design provides as compared to the designs of the prior art. Among these improvements are a wider cross-track width for the write gap than PWA ("pole width A", which is the MP ABS cross-track width at its widest edge) and STO widths, the write gap width ranging from 100 nm to 1 μm. In addition, the disclosed high moment trailing shield (HMTS) has a narrower cross-track width than write gap, being preferably aligned with the STO width, and that width can range from 10 nm to 500 nm. Further, the disclosed high moment trailing shield (HMTS) can be thinner in the down-track direction than prior-art structures, the thickness now ranging from 5 nm to 500 nm.

These advantages are all embodied in the perpendicular magnetic writer (PMR) configured for microwave assisted magnetic recording (MAMR) in the form of the STO or as spin assisted writing (SAW) that is disclosed herein. This writer includes a magnetic main pole (MP) that emerges at an air-bearing surface (ABS) and has a generally trapezoidal ABS face that is wider at a trailing-edge surface than at a leading-edge surface. The trailing-edge and leading-edge surfaces are connected by mirror-image symmetrically formed side edge surfaces to complete the trapezoidal cross-section.

A dielectric layer conformally surrounds the MP and forms a uniform gap between both side edge surfaces of said MP and the leading edge surface of the MP. This dielectric layer has an upper planar surface that is coplanar with the trailing edge surface of the MP and extends symmetrically away from the MP, forming uniform gaps.

A multi-layered spin-torque oscillator (STO) or a spin assisted writing device (SAW) is formed on the trailing edge side of the MP. The STO and SAW have the same width as the trailing edge side and is aligned with it. A high-moment trailing shield (HMTS) is formed on the STO or SAW, having their same width and being aligned with it. A write gap (WG) layer of uniform thickness is formed on the upper planar surface of the dielectric layer, the layer extending symmetrically from contiguity with left and write edges of the combined STO, SAW and HMTS layers.

BRIEF DESCRIPTION OF THE DRAWINGS

FIG. 2A is a plot of the perpendicular magnetic write field, Hy, in Oe, vs HS CT width in nm.

FIG. 2B is a plot of the erasure width under AC writing (EWAC) in nm vs. HS CT width in nm.

FIG. 2C is a plot of trailing shield (TS) return field in Oe vs. HS CT width in nm.

DETAILED DESCRIPTION

Figure 1A:
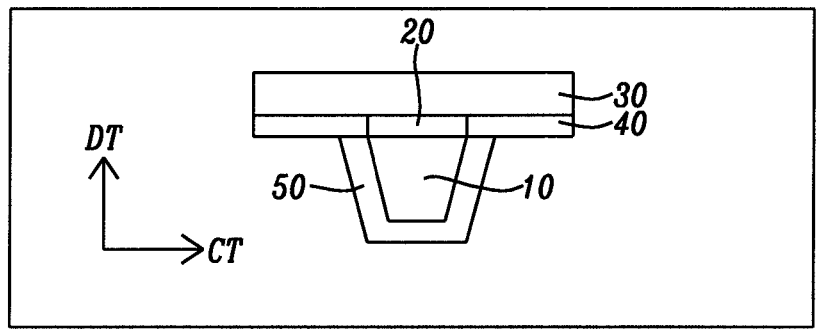
FIG. 1A is a schematic illustration of an ABS view of a typical MAMR writer head of the prior art.
Figure 1B:
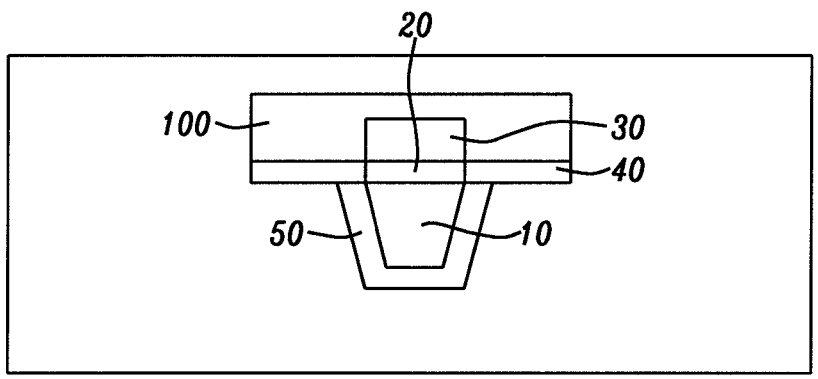
FIG. 1B is a schematic illustration of an ABS view of the MAMR writer head of the present disclosure.

Referring first to the schematic ABS view of FIG. 1A, there is shown a prior art MAMR writer design. Referring next to FIG. 1B, there is shown a schematic ABS view of the disclosed new MAMR design. In both figures the trapezoidal ABS face of the main magnetic pole (MP) is designated as 10, the spin torque oscillator (STO) is designated as 20, the high moment trailing shield (HMTS) is designated as 30 the write-gap (WG) is designated as 40 and the side gap (SG) is designated as 50. FIG. 1A has a pair of vectors showing the down-track direction (DT) and the cross-track direction (CT).

In the new design of FIG. 1B, the HMTS can shrink its size in both its down-track dimension (DT-direction) and cross track dimension (CT-direction). In addition, a trailing shield 100 is formed contacting top and side edges of said write gap layer, the top edge of said HMTS, and the top planar surface of said dielectric layer that extends symmetrically and laterally beyond said WG layer.

Figure 1C:
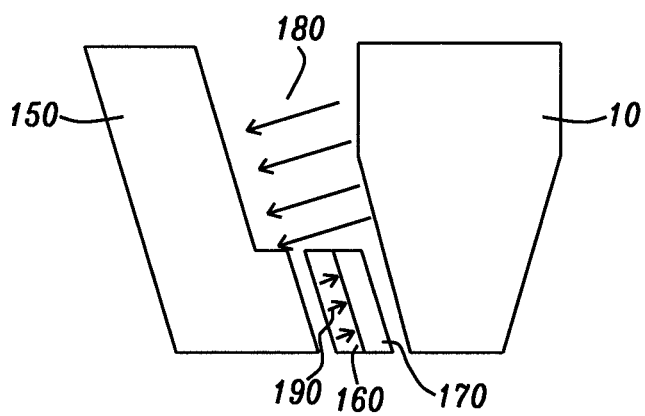
FIG. 1C schematically shows a side cross-sectional view of the structure of the main pole, the trailing shield and either a spin assisted writing (SAW) or STO device.

FIG. 1C has been discussed above and it schematically shows the configuration of the main pole and trailing shield of a STO or SAW configuration.

To confirm the writing performance of the new writer design, a series of finite-element method (FEM) simulations have been carried out and their results are shown in FIGS. 2A-2C, 3A-3C and 4.

Figure 2A:
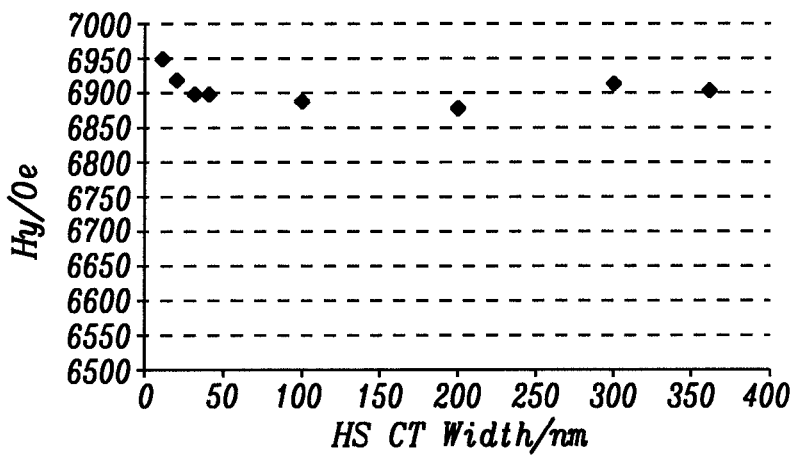
FIGS. 2A-2C illustrate the results of three finite element method (FEM) simulations that illustrate the performance of the disclosed writer, with the STO current turned off, under three different high-moment trailing shield (HMTS) cross-track (CT) widths. The HMTS down-track (DT) thickness is fixed at 70 nm while the HMTS CT width (HSw) is continuously varied from 360 nm to 10 nm. Note, the "high moment trailing shield" is referred to as HS in these figures.
Figure 2B:
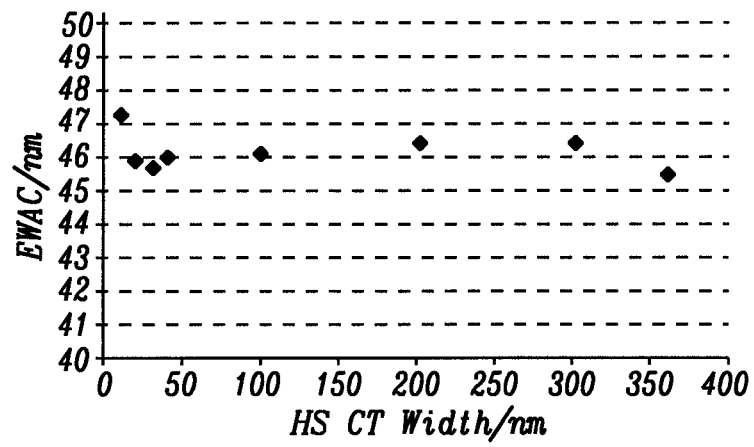
Figure 2C:
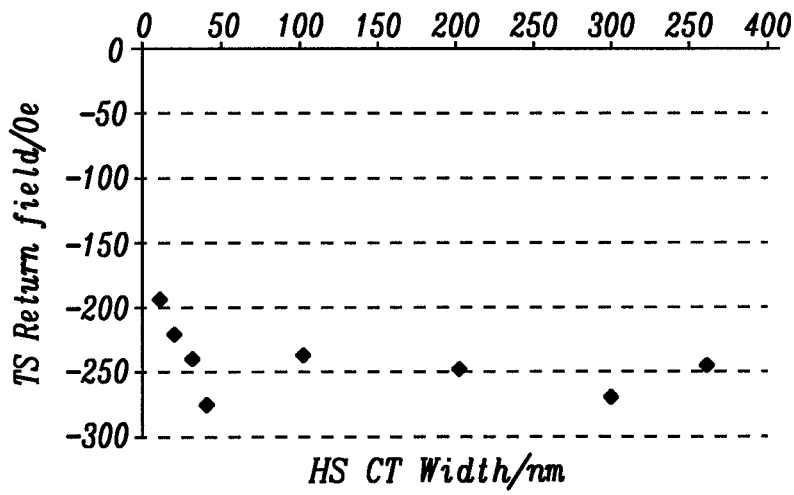

The simulation of FIG. 2A-2C is based on a MAMR writer (see FIG. 1B) with STO 20 current turned off. The PWA (Pole Width at the widest cross-track dimension of the pole, 10) is 40 nm, the side gap thickness (SG, 50) is 35 nm, the write gap (WG, 40) thickness is 17 nm, the write gap (WG 40) cross-track width is fixed at 360 nm. The simulation allows the HS CT width (cross-track width of the high-moment trailing shield 30) to be swept from 360 nm, which is the width of a prior art writer (such as FIG. 1A) used for comparison, to a much narrower value of 10 nm. FIG. 2A is a plot of magnetic field, Hy (Oe), vs. trailing shield cross-track width (HS CT Width/nm), FIG. 2B is a plot of EWAC (Erasure Width with AC writing) vs. trailing shield cross-track width and FIG. 2C is a plot of the trailing shield return field as a function of trailing shield cross-track width. As can be seen, a width of 30 nm in each of the figures reproduces the various performance characteristics of the prior-art writer.

The significance of the above figures is as follows. With the same write field, Hy, a smaller EWAC indicates a potentially improved TPI (tracks per inch). The return field represents the strength of the field that passes through the recording media and returns to the trailing shield. A more negative return field indicates a better BPI (bits per inch). It is to be noted that the magnetic material of the high-moment trailing shield (HMTS) typically has a Bs of 24 kG (kilo-Gauss), but it can range from approximately 18 kG to 24 kG. Ordinary trailing shield material has a Bs of 16 kG, but it may range from approximately 1 kG to 18 kG. We note also that the write gap, WG 40 has a wider cross-track width than the maximum width of the pole, PWA, ranging from 100 nm to 1 μm. The HMTS has a narrower cross-track width than the WG 40, being preferably aligned with the STO width, but can range from approximately 10 nm to 500 nm. The HMTS can have a thinner down-track thickness than the prior-art structure used for comparison purposes, ranging from approximately 5 nm to 500 nm.

Figure 3A:
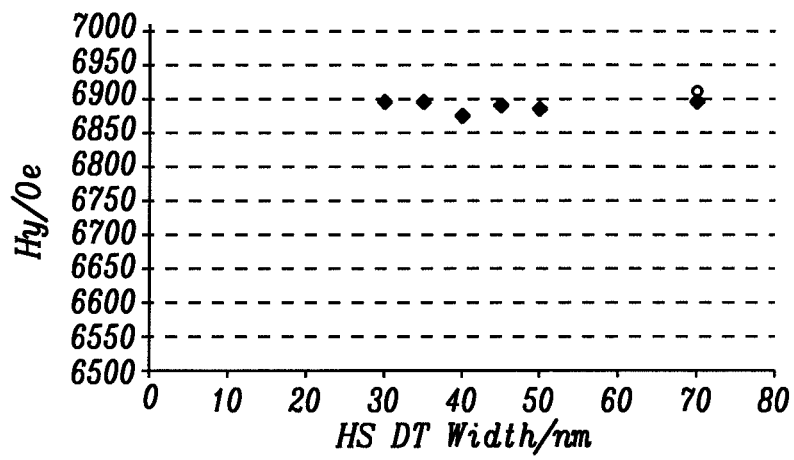
FIG. 3A-3C are the results of a FEM simulation in which the presently disclosed writer is again simulated, but now there are three different HS down-track (DT) thicknesses (HSt) while the HS CT width is fixed at 40 nm. HSt is continuously varied from 70 nm to 30 nm.

Referring next to a simulation that was performed and whose results are shown in FIG. 3A. In this simulation of the Hy return field the writer has its STO turned off under different high moment trailing shield down track (HMTS DT) thicknesses. The high moment trailing shield cross-track (HMTS CT) width is fixed at 40 nm. The circular data point corresponds to a comparison prior-art writer with the high moment trailing shield width (HMTS w) being approximately 360 nm and the high moment trailing shield thickness (HMTS t) being approximately 70 nm.

Figure 3B:
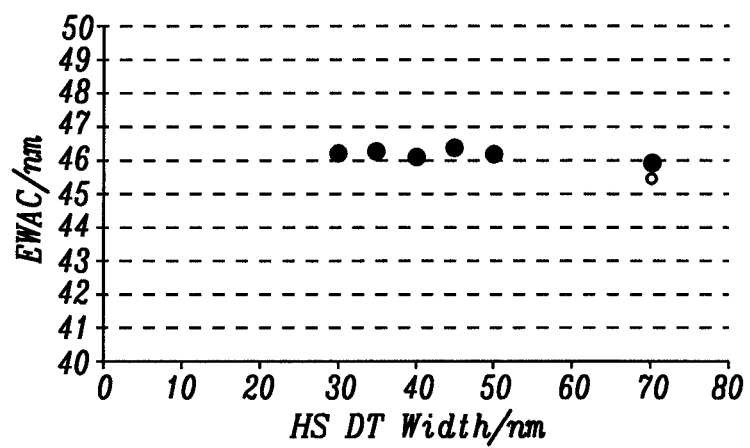
Figure 3C:
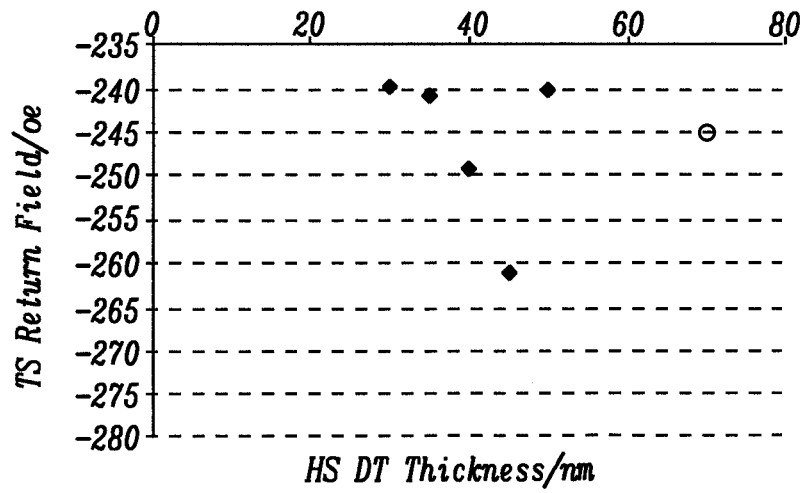

FIGS. 3B and 3C are plots of EWAC and HMTS return field respectively. The results of these three simulations indicate that an HSw above 30 nm can preserve similar TS return field and EWAC as the comparison prior-art writer.

Figure 4:
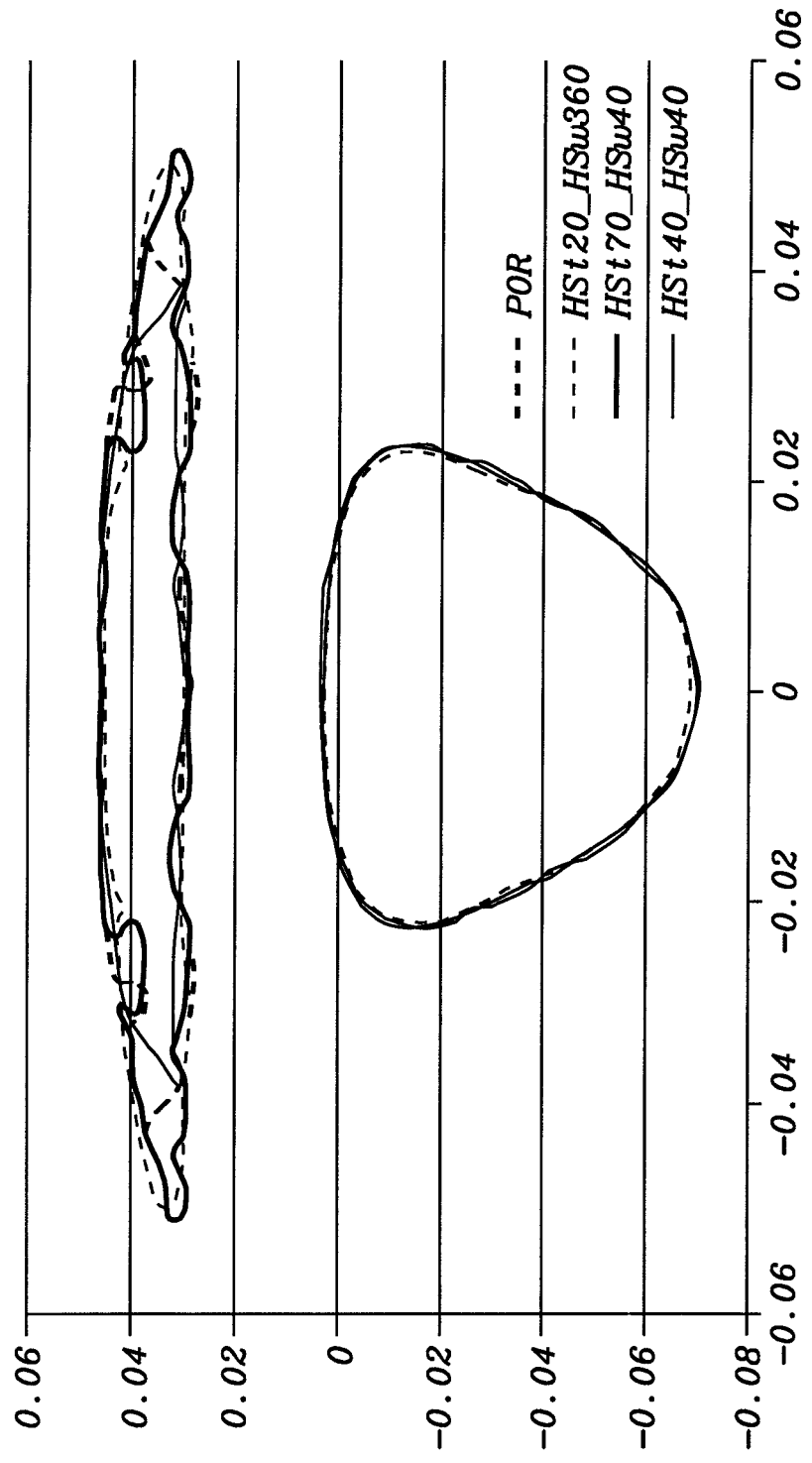
FIG. 4 is a set of simulated contour lines with the perpendicular field, Hy, at 5000 Oe and the trailing shield return field at −200 Oe, for four different designs.

Referring finally to FIG. 4 there is shown simulated contour lines of Hy (the magnetic write field) at 5000 Oe and a trailing shield return field at −200 Oe with different designs. The design labeled POR is the presently used (prior-art) writer, the remaining three designs represent the disclosed writer at three different simulated shield configurations. Basically, the presently disclosed writer design produces the performance characteristics of the POR design.

Figure 5:
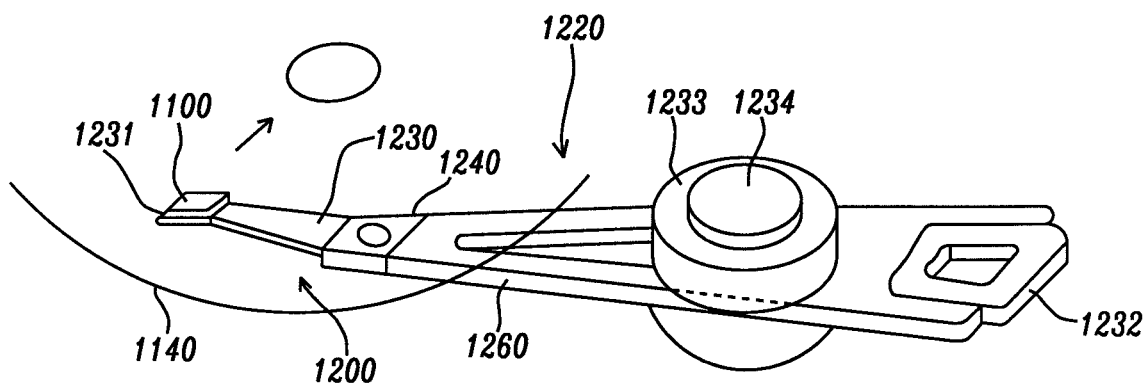
FIG. 5 schematically shows a perspective view of a head gimbal assembly of the present recording apparatus.

FIG. 5 shows a head gimbal assembly (HGA) 1200 that includes a slider-mounted PMR writer 1100, the slider now providing aerodynamic support to the writer when it moves above or below an operational disk recording medium 1140. There is also shown a suspension 1220 that elastically supports the slider-mounted writer 1100. The suspension 1220 has a spring-like load beam 1230 made with a thin, corrosion-free elastic material like stainless steel. A flexure 1231 is provided at a distal end of the load beam and a base-plate 1240 is provided at the proximal end. The slider mounted TAMR writer 1100 is attached to the load beam 1230 at the flexure 1231 which provides the TAMR with the proper amount of freedom of motion. A gimbal part for maintaining the PMR read/write head at a proper level is provided in a portion of the flexure 1231 to which the TAMR 1100 is mounted.

A member to which the HGA 1200 is mounted to arm 1260 is referred to as head arm assembly 1220. The arm 1260 moves the read/write head 1100 in the cross-track direction (arrow) across the medium 1140 (here, a hard disk). One end of the arm 1260 is mounted to the base plate 1240. A coil 1232 to be a part of a voice coil motor (not shown) is mounted to the other end of the arm 1260. A bearing part 1233 is provided to the intermediate portion of the arm 1260. The arm 1260 is rotatably supported by a shaft 1234 mounted to the bearing part 1233. The arm 1260 and the voice coil motor that drives the arm 1260 configure an actuator.

Figure 6:
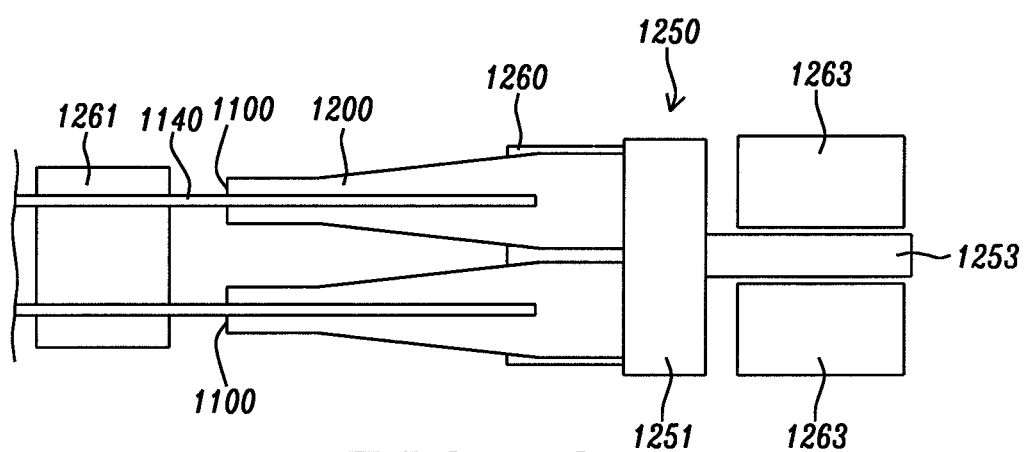
FIG. 6 schematically shows a side view of a head stack assembly of the present recording apparatus.
Figure 7:
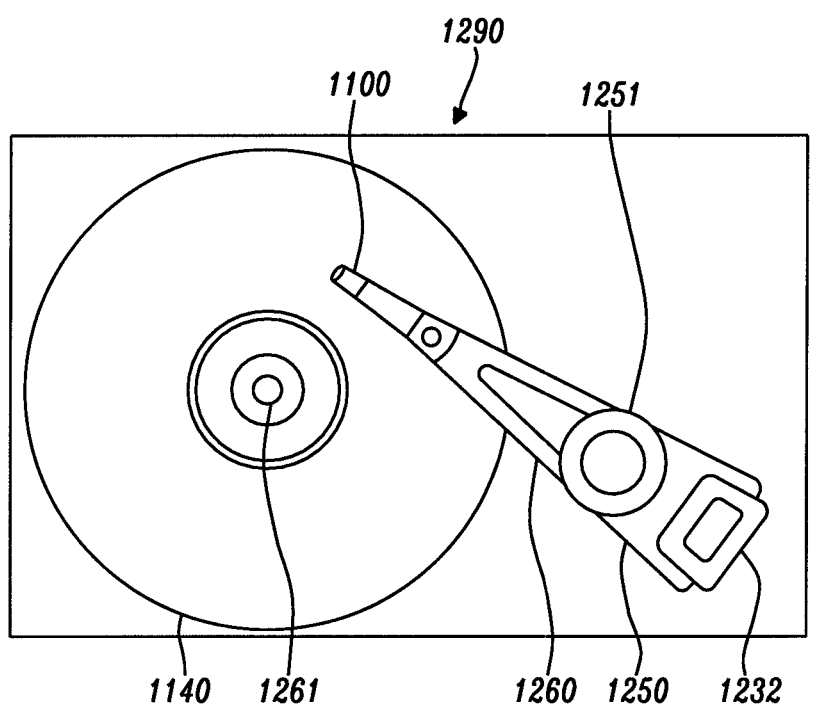
FIG. 7 schematically shows a plan view of the magnetic recording apparatus within which are mounted the components shown in FIGS. 5 and 6.

Referring next to FIG. 6 and FIG. 7, there is shown a head stack assembly 1250 and a magnetic recording apparatus in which the slider-mounted TAMR writer 1100 is contained. The head stack assembly is an element to which the HGA 1200 is mounted to arms of a carriage having a plurality of arms for engaging with a plurality of disks 1140. The plurality of disks are mounted on a spindle 1261. FIG. 6 is a side view of this assembly and FIG. 7 is a plan view of the entire magnetic recording apparatus.

Referring finally to FIG. 7, the head stack assembly 1250 is shown incorporated into a magnetic recording apparatus 1290. The magnetic recording apparatus 1290 has a plurality of magnetic recording media 1114 mounted on a spindle motor 1261. Each individual recording media 1114 has two TAMR elements 1100 arranged opposite to each other across the magnetic recording media 14 (shown clearly in FIG. 5). The head stack assembly 1250 and the actuator (except for the write head itself) act as a positioning device and support the PMR heads 1100. They also position the PMR heads correctly opposite the media surface in response to electronic signals. The read/write head records information onto the surface of the magnetic media by means of the magnetic pole contained therein.

As is finally understood by a person skilled in the art, the detailed description given above is illustrative of the present disclosure rather than limiting of the present disclosure. Revisions and modifications may be made to methods, materials, structures and dimensions employed in forming and providing a PMR writer configured for either of two forms of MAMR operation having a high moment trailing shield (HMTS) that is aligned with a spin torque oscillator layer (STO), while still forming and providing such a structure and its method of formation in accord with the spirit and scope of the present invention as defined by the appended claims.

We claim:

1. A perpendicular magnetic writer (PMR) configured for spin assisted magnetic writing (SAW), comprising:
    a magnetic main pole (MP) emerging at an air-bearing surface (ABS) and having a trapezoidal ABS face that is wider at a trailing edge surface than at a leading-edge surface and wherein said trailing and leading-edge surfaces are connected by symmetrically formed side edge surfaces;
    a dielectric layer conformally surrounding said MP and forming a uniform gap adjacent to both side edge surfaces of said MP and said leading edge surface of said MP; wherein
    said dielectric layer has an upper planar surface that is coplanar with said trailing edge surface of said MP and that extends symmetrically away from said MP from said uniform gaps;
    a spin-assisted writing device (SAW) formed on the trailing edge side of said MP and having the same width as said trailing edge side and aligned with it; wherein said SAW is configured to provide a magnetization opposite to the direction of a gap field and, thereby, enhances the magnetic field of said MP when said magnetic field is impinging on an adjacent recording media;
    a high-moment trailing shield (HMTS) formed on said SAW and having the same width of said SAW and aligned with it;
    a write gap (WG) layer formed on said upper planar surface of said dielectric layer and having a uniform thickness, said layer extending symmetrically from contiguity with left and right edges of the combined SAW and HMTS.

2. The PMR of claim 1 further comprising a trailing shield formed contacting top and side edges of said write gap layer, the top edge of said HMTS, and the top planar surface of said dielectric layer that extends symmetrically and laterally beyond said WG layer.

3. The PMR of claim 2 wherein said HMTS is a layer of magnetic material having a Bs between approximately 18 kG and 24 kG and having a width between 10 nm and 360 nm.

4. The PMR of claim 1 wherein said HMTS is a layer of magnetic material having a Bs between approximately 18 kG and 24 kG and having a width between 10 nm and 360 nm.

5. The PMR of claim 1 wherein said WG has a wider cross-track width than PWA, the maximum width of the pole, said width ranging between approximately 100 nm and 1 μm.

6. The PMR of claim 1 wherein said WG layer is a layer of non-magnetic material and wherein the minimum total width of said WG layer is the width of said SAW and the maximum width can vary between approximately 1 Onm and 1 μm.

7. The PMR of claim 1 wherein off-center WG thickness can range between approximately 2 nm and 50 nm.

8. The PMR of claim 1 wherein said HMTS has a narrower width than the WG and is preferably aligned with said STO, but wherein said HMTS width can range between approximately 10 nm and 500 nm.

9. The PMR of claim 1 wherein said HMTS has a thinner down-track thickness than said prior-art structure used for comparison purposes, said thickness ranging from between approximately 5 nm and 500 nm.

10. A head gimbal assembly, comprising
    the PMR write head of claim 1 mounted on a slider;
    a suspension that elastically supports said slider-mounted PMR read/write head, wherein
    said suspension has a flexure to which said slider-mounted PMR read/write head is joined, a load beam with one end connected to said flexure and a base plate connected to the other end of said load beam.

11. A HDD (Hard Disk Drive), comprising:
    the head gimbal assembly of claim 10;
    a magnetic recording medium positioned opposite to said slider-mounted TAMR;
    a spindle motor that rotates and drives said magnetic recording medium;
    a device that supports the slider and that positions said slider relative to said magnetic recording medium.

* * * * *